(12) United States Patent
Endo

(10) Patent No.: US 7,272,632 B2
(45) Date of Patent: Sep. 18, 2007

(54) DISTRIBUTED SYSTEM AND MULTIPLEXING CONTROL METHOD FOR THE SYSTEM

(75) Inventor: Kotaro Endo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 390 days.

(21) Appl. No.: 10/083,572

(22) Filed: Feb. 27, 2002

(65) Prior Publication Data

US 2002/0194276 A1    Dec. 19, 2002

(30) Foreign Application Priority Data

Jun. 15, 2001    (JP)    ............... 2001-181791

(51) Int. Cl.
 *G06F 15/16* (2006.01)
(52) U.S. Cl. ...................... 709/205; 709/201
(58) Field of Classification Search ................ 709/205, 709/201, 202, 203
See application file for complete search history.

(56) References Cited

U.S. PATENT DOCUMENTS

| | | | | |
|---|---|---|---|---|
| 4,794,596 A | * | 12/1988 | Gloyne et al. | ............... 370/241 |
| 5,832,289 A | * | 11/1998 | Shaw et al. | ..................... 712/30 |
| 5,870,545 A | * | 2/1999 | Davis et al. | ................. 709/201 |
| 6,484,257 B1 | * | 11/2002 | Ellis | ........................... 713/153 |
| 2001/0037472 A1 | * | 11/2001 | Li | .................................. 714/4 |

FOREIGN PATENT DOCUMENTS

| | | | |
|---|---|---|---|
| JP | 03206000 A | * | 9/1991 |
| JP | 3-119217 | | 12/1991 |
| JP | 7-239831 | | 9/1995 |
| JP | 200165365 A | * | 6/2002 |

OTHER PUBLICATIONS

Lynch, Nancy A., "Distributed Algorithms," Morgan Kaufmann Publishers, Inc., pp. 672-677, 1996.*
Lynch, Nancy A, "Distributed Algorithms," Morgan Kaufmann Publishers, Inc, 1996, pp. 672-677.*
Mostefaoui, Achour and Raynal, Michel, "A Condition for k-Set Agreement in Asynchronous Distributed Systems," Apr. 2000, IEEE, pp. 1-6.*
Lynch, Nancy A., "Distributed Algorithms", Morgan Kaufmann Publishers, Inc., pp. 672-677, 1996.
Notification of Reasons for Rejection issued by the Japanese Patent Office, mailed Feb. 27, 2007, in Japanese Application No. 2004-204670 and English translation of Notification.

* cited by examiner

*Primary Examiner*—Jason Cardone
*Assistant Examiner*—Azizul Choudhury
(74) *Attorney, Agent, or Firm*—Finnegan, Henderson, Farabow, Garrett & Dunner, L.L.P.

(57) ABSTRACT

A distributed system of this invention forms multiplexing by n computers, and permits up to f computers to fail and halt. Respective computers exchange input candidates via an internal network B, and generate lists of input candidates. Each computer repeats generation of the list until (n−f) identical input candidates appear in that list. A computer which satisfies this condition executes its process irrespective of the states of other computers. This distributed system never generates a split brain in principle, and never interrupts a process upon occurrence of a failure due to time-out since it does not perform any failure detection.

6 Claims, 8 Drawing Sheets

|   | Computer (1) | Computer (2) | Computer (3) | Computer (4) |
|---|---|---|---|---|
| 1 | A (Select candidate) | A (Select candidate) | B (Select candidate) | C (Select candidate) |
| 2 | [A(1), A(2), B(3)] (Generate candidate list) | [A(1), A(2), C(4)] (Generate candidate list) | [A(2), B(3), C(4)] (Generate candidate list) | [A(1), A(2), C(4)] (Generate candidate list) |
| 3 | A (Select candidate) | A (Select candidate) | C (Select candidate) | A (Select candidate) |
| 4 | [A(1), A(2), A(4)] (Generate candidate list) | [A(1), A(2), C(3)] (Generate candidate list) | [A(1), A(2), C(3)] (Generate candidate list) | [A(2), C(3), A(4)] (Generate candidate list) |
| 5 | Determine (A) | A (Select candidate) | A (Select candidate) | A (Select candidate) |
| 6 | —— | [A(1), A(2), A(3)] (Generate candidate list) | [A(2), A(3), A(4)] (Generate candidate list) | [A(2), A(3), A(4)] (Generate candidate list) |
| 7 | —— | Determine (A) | Determine (A) | Determine (A) |

FIG. 4

DISTRIBUTED SYSTEM AND MULTIPLEXING CONTROL METHOD FOR THE SYSTEM

CROSS-REFERENCE TO RELATED APPLICATIONS

This application is based upon and claims the benefit of priority from the prior Japanese Patent Application No. 2001-181791, filed Jun. 15, 2001, the entire contents of which are incorporated herein by reference.

BACKGROUND OF THE INVENTION

1. Field of the Invention

The present invention relates to a distributed system in which four or more computers are connected via a network, and a multiplexing control method for the system and, more particularly, to a distributed system which can provide a split-brain solution and realtimeness upon occurrence of a failure at the same time, and a multiplexing control method for the system.

2. Description of the Related Art

In recent years, computer and network technologies have improved remarkably. As a result, there have been attempts to computerize jobs in various kinds of businesses. Many jobs must not be interrupted due to failures depending on their contents, and it has recently become a common practice to build a distributed system by connecting a plurality of computers via a network. As one running method of such a distributed system, multiplexing of execution of deterministic programs using ordered multicast is known.

"Ordered multicast", "deterministic programs", and "multiplexing" will be explained below.

Ordered Multicast

In an environment such as a distributed system in which a plurality of computers are connected, the respective computers operate independently. Therefore, in order to make these computers operate synchronously, a special mechanism is required. Ordered multicast is a mechanism for delivering an input to the distributed system to all computers, and guarantees that data arrive at all computers in the same order.

Deterministic Program

Execution of a program amounts to determining the output and the next state in correspondence with the state of a computer when an input is given to the computer. A deterministic program is defined as a program which uniquely determines the output and the next state in accordance with a given input. More specifically, the deterministic program is one that references neither arbitrary values nor random numbers. A feature of the deterministic program lies in unique execution if an initial state and input sequence are determined. In the following description, a "program" in this specification indicates such a deterministic program.

Multiplexing

In a distributed system, respective computers may fail independently. If the entire system does not work due to a failure of only one computer, the availability of the distributed system is lower than that of a single computer. To avoid such a situation, processes associated with the overall system must be multiplexed. By contrast, multiplexing makes the availability of the distributed system higher than that of a single computer. For example, If a distributed system constituted by 10 computers each having an availability of 99% is not multiplexed at all, the availability of that distributed system is as low as about 90%. If this system can withstand failures of up to three computers as a result of multiplexing, the system availability becomes as high as 99.9998%.

Multiplexing of execution of deterministic programs using ordered multicast will be explained below. Assume that a distributed system is constituted by a plurality of computers, and each computer which participates in multiplexing has identical programs.

All computers start from an identical initial state. After that, input data are delivered to all computers in the same order via ordered multicast, thus executing respective programs.

Since input sequences to respective programs have the same order by ordered multicast, the states of all computers are maintained equal to each other due to the feature of the deterministic programs, and all output sequences are equal to each other. That is, execution of programs is multiplexed.

An implementation method of ordered multicast will be briefly explained below.

In order to implement ordered multicast independently of special hardware, exchange of messages according to an appropriate algorithm among computers, i.e., a protocol, is used. Prior to a detailed description of the algorithm, points to be noted will be listed.

As the system is premised on all computers may each fail and may come to a halt at any time, the overall process must not depend on a specific computer to establish multiplexed processes. Therefore, the following points must be noted.

(1) Reception of input to the distributed system is not fixed at a specific computer.

For example, a simple algorithm in which input reception is fixed at a specific computer to determine the order of inputs by temporarily transferring all inputs to that computer, and the inputs are delivered in that order, cannot be used. With this algorithm, if the computer at which input reception is fixed has failed and come to a halt, the order of inputs cannot be determined at that time.

(2) The delivery of input data items to all computers is not fixed at a specific computer.

For example, a simple algorithm in which a specific computer delivers to all computers that are not at halt, cannot be used. With this algorithm, if a delivery computer has failed and halted during delivery, delivery cannot be completed after data are delivered to only some computers.

The aforementioned algorithm will be described in detail below in consideration of the above points.

Conventionally, failure detection plays an important role. Typically, failure detection is done by a heartbeat time-out algorithm. This algorithm determines a failure of a given computer if heartbeats periodically output from each computer cannot be confirmed for a predetermined period of time or more.

Each computer has an input reception queue. As the first step, each computer delivers an input data item located at the head position of the input reception queue to all other computers as a next candidate to be processed by that computer. A computer with an empty input reception queue delivers an input data item obtained first from another computer to all other computers as a next candidate to be processed by that computer.

As the final result of the first step, each computer obtains one or both of "input candidates" and "failure detection" for all computers. A list of "input candidates" and "failure detection" for all computers will be simply referred to as a "list" hereinafter.

As the second step, each computer delivers its own "list" to all other computers. Note that these "lists" may be different in respective computers. This is because if a given computer has failed and halted during the first step, it may deliver its "input candidate" to only some computers. Also, "failure detection" may not be right at the beginning of the second step.

As a result of the second step, if the "lists" obtained from other computers are different from the own "list", each computer combines them into its own "list", and repeats the second step. As a final result of the second step, all "lists" of other computers which are free from failures match the own "list". At that time, the protocol is complete.

Note that each computer can select an input to be delivered by ordered multicast from "input candidates" of its "list" in accordance with a predetermined rule (e.g., the first one). Finally, the selected input is removed from the input reception queue.

With the aforementioned sequence, multiplexing of execution of deterministic programs using ordered multicast in a distributed system in which a plurality of computers are connected via a network is implemented.

The aforementioned sequence suffers the following problems.

(1) Split Brain

A split brain indicates one or more partitions of the context of execution. This split brain occurs when failure detection has been erroneously done. For example, if computers which form a system cannot communicate with each other between two computer groups (network partitioning), these computer groups respectively detect failures and begin to operate independently. Or heartbeat transmission/reception is interrupted due to a temporary high load, and erroneous detection of failures occurs, resulting in a split brain.

Multiplexed processes are most certainly the important ones in the system. If a split brain has occurred, the processes become inconsistent, and may fatally influence the entire system.

In order to make a split brain harder to occur, erroneous detection of failures must be made harder to occur. For this purpose, a sufficiently large time-out value of heartbeats must be assured. In practice, a time-out value of 10 sec to 1 min is normally used.

(2) Realtimeness of Process Upon Occurrence of Failure

If a large time-out value is set, the time from when a failure has occurred until it is detected is prolonged. Then, detection of a failed computer is delayed in the ordered multicast protocol, and execution of ordered multicast temporarily stops during that time. As a result, execution of multiplexing temporarily stops.

Normally, such a situation does not fatally influence the system. However, in a system that attaches an importance to realtimeness, this requirement may not always be met. That is, the upper limit of the heartbeat time-out value is suppressed due to the presence of the realtimeness requirement, and an excessively large value cannot be set.

Consequently, the setup of the heartbeat time-out value may suffer a trade-off relationship between a split brain and realtimeness.

BRIEF SUMMARY OF THE INVENTION

The present invention has been made in consideration of the above situation, and has as its object to provide a distributed system which can provide a split-brain solution and realtimeness upon occurrence of a failure at the same time, and a multiplexing control method for the system.

In order to achieve the above object, the present invention neither generates a split brain in principle nor interrupts a process upon occurrence of a failure by ceasing failure detection. For this purpose, according to the present invention, if at least (n−f) computers are in operation, an input is delivered to these computers irrespective of the operations of other f computers.

More specifically, according to the present invention, there is provided a distributed system which makes n computers, which are connected via a network, operate synchronously, and provides multiplexing of at least (n−f) computers, each computer comprising: an input candidate collection device configured to collect input data items, each of which is selected as a next candidate to be processed by each of n computers, via the network; a first input candidate selection control device configured to determine whether not less than (n−f) input data items having identical contents are present, when the input candidate collection device has collected the not less than (n−f) input data items, and to settle one of the input data items having identical contents as next data to be processed, when the not less than (n−f) input data items having the identical contents are present; a second input candidate selection control device configured to determine whether the majority of collected input data items having identical contents are present, when the first Input candidate selection control device determines that the not less than (n−f) input data items having identical contents are not present, and to cause the input candidate collection device to reexecute collection after selecting the input data item as a self candidate and discard the all input data items of other candidates, when the majority of collected Input data items are present; and a third input candidate selection control device configured to cause the input candidate collection device to reexecute collection after arbitrarily selecting input data item from the collected Input data items as a self candidate and discarding all input data items of other candidates, when the second input candidate selection control device determines that the majority of the collected input data items are not present.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 3 shows the layout of protocol data exchanged between computers which form the distributed system of the embodiment;

FIG. 4 is a table for explaining an outline of a principal part of ordered multicast executed by the distributed system of the embodiment;

DETAILED DESCRIPTION OF THE INVENTION

An embodiment of the present invention will be described hereinafter with reference to the accompanying drawings.

Preconditions of a distributed system according to this embodiment will be explained first. Assume that the number of computers which form multiplexing is n, and up to f computers are allowed to fail and halt. That is, programs to be multiplexed run on at least (n−f) computers. If (f+1) or more computers have failed and halted, multiplexing does not continue (so-called "fail-stop").

Note that f is a maximum integer that satisfies 3f<n. For example, if n=4, f=1. If n=10, f=3. This conditions limits the availability of the system. However, if n=10, no problem is posed in practical use according to the aforementioned calculation of the availability.

Inputs/outputs of programs to be multiplexed are unreliable datagrams. This permits loss, redundancy, and change in order for input/output packets. As an example of unreliable datagrams, IP (Internet Protocol) is known.

Note that the non-determinism of such unreliable datagrams is not incompatible to the determinism of programs to be multiplexed. The determinism of programs indicates that the next state and output are uniquely determined if an input is determined, and means that which pertains to internal operations of the programs. On the other hand, unreliable datagrams indicate that loss, redundancy, and change in order may occur until outputs from a certain program are passed to inputs of other programs, and means non-determinism which pertains to inputs/outputs among programs.

The arrangement of this distributed system will be explained below with reference to FIGS. 1 and 2.

Figure 1:
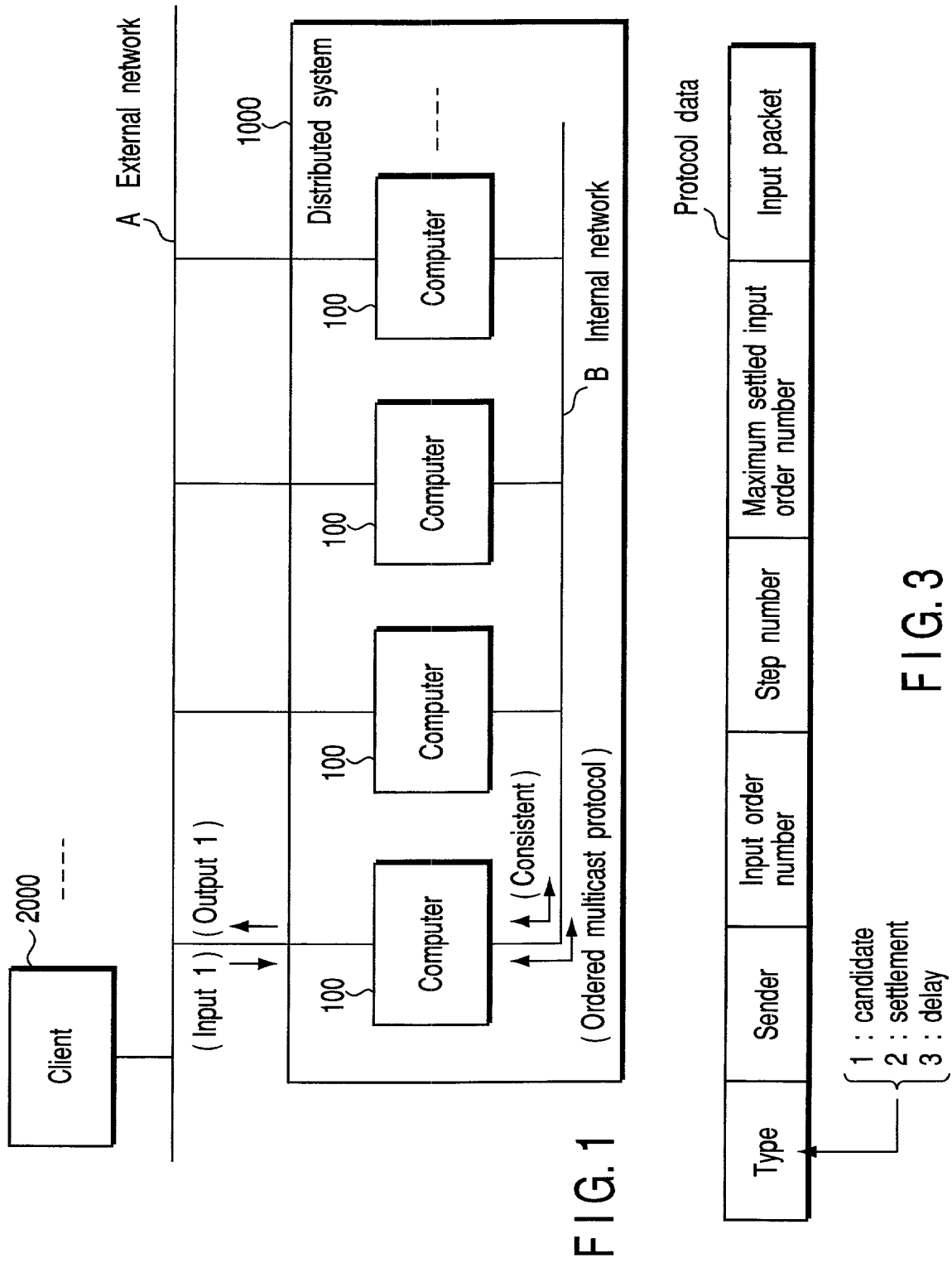
FIG. 1 is a block diagram showing the arrangement of a distributed system according to an embodiment of the present invention.

As shown in FIG. 1, a distributed system 1000 is multiplexed by n computers 100, each of which is connected to a plurality of clients 2000 via an external network A. These computers 100 are connected via an internal network B. Each computer 100 in this distributed system 1000 processes input packets (inputs 1) received from the clients 2000 via the external network A or input packets (inputs 2) received from other computers 100 via the internal network B in the same order as in other computers 100. An input packet (input 1) from each client 2000 is input to one of n computers 100. An example of input packets (inputs 2) from other computers 100 is an input packet which is generated by another arbitrary computer 100, i.e., in a local environment in the distributed system 1000, and processing of which is requested via the internal network B.

Output packets generated by this process are returned to the clients 2000 via the external network A (outputs 1), or are returned to other computers 100 via the internal network B (outputs 2).

Figure 2:
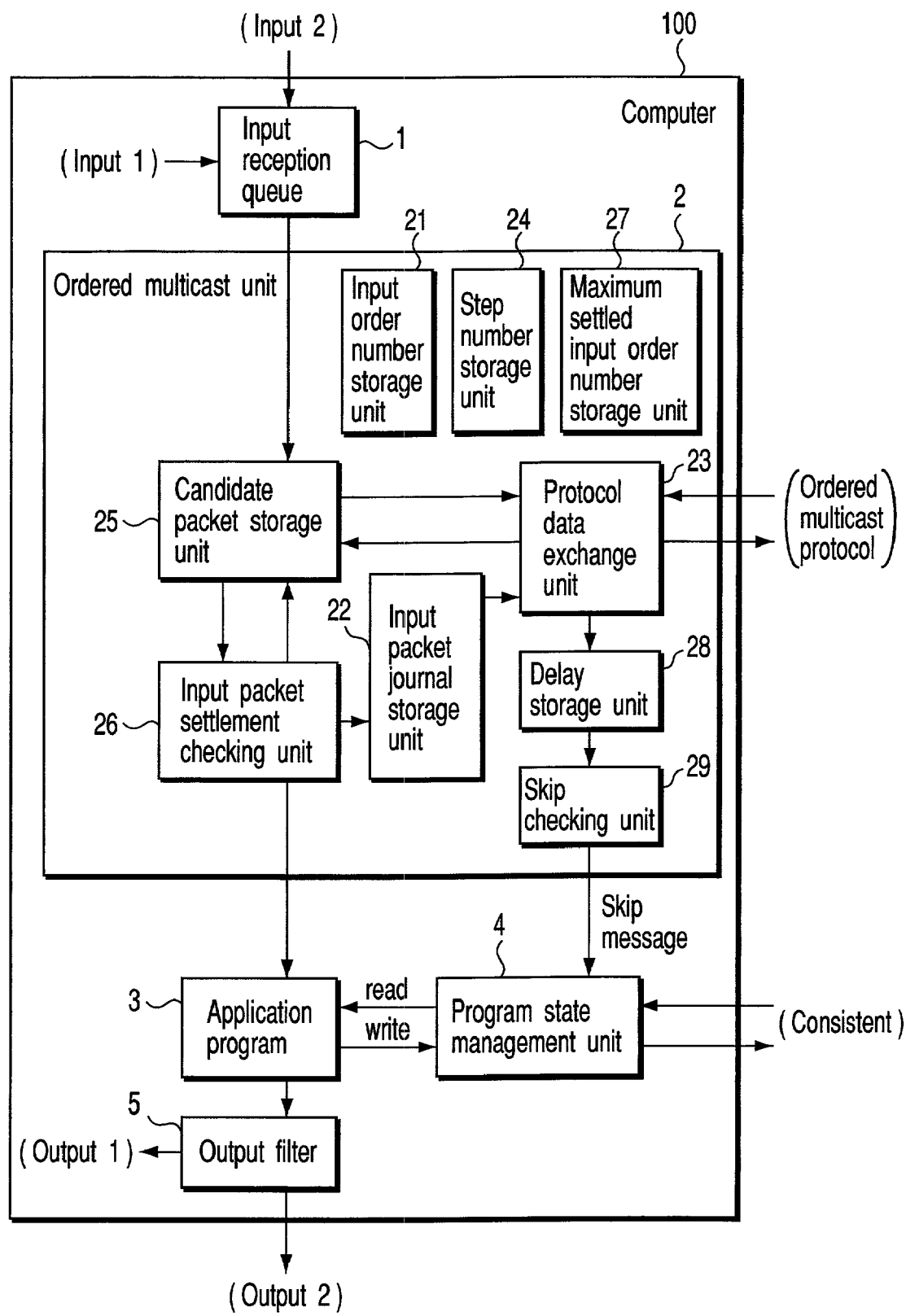
FIG. 2 is a functional block diagram of a computer which forms the distributed system of the embodiment.

FIG. 2 shows the arrangement of the computer 100. An input packet received by an input reception queue 1 is delivered to an application program 3 by an ordered multicast unit 2. Upon receiving the delivered input packet, this application program 3 runs in accordance with the state saved in a program state management unit 4, and generates an output packet. The output packet is filtered by an output filter 5 and is then output.

The components of the ordered multicast unit 2 will be explained below.

An input order number storage unit 21 stores an order number of the next input packet to be delivered to that computer by ordered multicast. An input packet journal storage unit 22 stores a given size of a sequence of input packets, delivery to that computer of which has been settled by ordered multicast, from the latest one. A protocol data exchange unit 23 exchanges protocol data with a protocol data exchange unit 23 of another computer.

A step number storage unit 24, candidate packet storage unit 25, and input packet settlement checking unit 26 are used in an algorithm for determining the next input packet to be delivered to that computer by ordered multicast. The step number storage unit 24 stores the step number of the protocol. The candidate packet storage unit 25 stores a total of n input packets, which become "input candidates" of respective computers in that step. The input packet settlement determination unit 26 checks settlement of an input packet and determines "input candidates" of the next step on the basis of the information in the candidate packet storage unit 25.

A maximum settled input order number storage unit 27 stores a maximum input order number of packets, delivery of which has been settled, including those of other computers. A delay storage unit 28 comprises (n−1) flags, and stores if it is delayed from other computers. A skip checking unit 29 checks necessity/non-necessity of a skip process based on the information in the delay storage unit 28, and executes the skip process if necessary.

In the following description, the corresponding input order number indicates that stored in the input order number storage unit 21, the corresponding step number indicates that stored in the step number storage unit 24, the corresponding maximum settled input order number indicates that stored in the maximum settled input order number storage unit 27, the self candidate indicates "input candidate" corresponding to the self computer in the candidate packet storage unit 25, and other candidates indicate "input candidates" other than the self candidate in the candidate packet storage unit 25.

FIG. 3 shows the layout of protocol data exchanged by the protocol data exchange unit 23.

As shown in FIG. 3, the protocol data exchanged by the protocol data exchange unit 23 contains type, sender, input order number, step number, maximum settled input order number, and input packet fields. Depending on the contents of the first type field, this protocol data is selectively used in three ways:

(1) Candidate type: The input order number field, step number field, and input packet field respectively store the corresponding input order number, corresponding step number, and self candidate at the time of sending by the sender.

(2) Settlement type: This protocol data indicates that an input packet corresponding to that input order number is stored in the input packet journal storage unit 26 at the time of sending by the sender, and the input packet field stores that input packet. In this case, the step number field is not used.

(3) Delay type: This protocol data indicates that an input packet corresponding to that input order number is not stored in the input packet journal storage unit 26 at the time of sending by the sender. In this case, the step number field and input packet field are not used.

In any of these types, the maximum settled input order number field stores the corresponding maximum settled input order number at the time of sending by the sender. Assume that the corresponding settled input order number is updated to a largest one of the order numbers of input packets settled in that computer, and the maximum settled input order number in the received protocol data.

An outline of a principal part of ordered multicast executed by the ordered multicast unit 2 will be explained below with reference to FIG. 4.

Assume that the number of computers which form multiplexing, i.e., n is 4. Also, since f is a maximum integer that satisfies 3f<n, f=1. Therefore, in this example, at least (n−f) computers, i.e., three or more computers execute processes while maintaining consistency.

Assume that computers (1) and (2), computer (3), and computer (4) respectively select A, B, and C as input candidates in a first step. Assume that computer (1) collects input candidate A of computer (2) and input candidate B of computer (3) in a second step. That is, computer (1) collects (n−f) candidates including the self candidate and other candidates. At this time, computer (1) attempts to check input candidates before collecting the input candidate of computer (4). However, since the input candidates do not include (n−f) identical candidates, computer (1) executes re-selection of an input candidate. Upon re-selection, if given candidates account for a majority of the collected input candidates, that candidate is selected; if such candidate is not present, one of the collected candidates is randomly selected. In this case, since A accounts for a majority, computer (1) re-selects A as a self candidate in a third step.

In this way, assume that computer (2) collects input candidate A of computer (1) and input candidate C of computer (4), and then re-selects A as a self candidate; computer (3) collects input candidate A of computer (2) and input candidate C of computer (4), and then re-selects C as a self candidate; and computer (4) collects input candidate A of computer (1) and input candidate A of computer (2), and then re-selects A as a self candidate.

Assume that computer (1) collects input candidate A of computer (2) and input candidate A of computer (4) in a fourth step. That is, computer (1) has collected (n−f) candidates including the self candidate and other candidates again. At this time, computer (1) attempts to check input candidates before collecting the input candidate of computer (3). In this case, since there are (n−f) candidates A, computer (1) determines A as an input in a fifth step.

On the other hand, assume that computer (2) collects input candidate A of computer (1) and input candidate C of computer (3). However, since (n−f) identical candidates are not present yet, computer (2) executes re-selection of an input candidate, and selects A that accounts for a majority as a self candidate. Likewise, assume that computer (3) collects input candidate A of computer (1) and input candidate A of computer (2), computer (4) collects input candidate A of computer (2) and input candidate A of computer (3), and these computers then re-select A as self candidates.

Assume that computer (2) selects input candidate A of computer (1) and input candidate A of computer (3) in a sixth step. In this case, since input candidate A of computer (1) is already not a candidate but a settled input, computer (2) determines A as an input in a seventh step.

On the other hand, assume that computer (3) collects input candidate A of computer (2) and input candidate A of computer (4), and computer (4) collects input candidate A of computer (2) and input candidate A of computer (3). In this case, since there are (n−f) candidates A, computers (3) and (4) determine A as their inputs.

That is, since each computer does not exchange heartbeats with other computers at all to confirm normal operation, this distributed system does not generate any split brain in principle, never interrupts processes due to time-out upon occurrence of a failure, and guarantees multiplexing of at least (n−f) computers.

The operation principle of the ordered multicast unit 2 will be described in detail below.

In an initial state, the input order number storage unit 21 stores an initial input order number (e.g., 1). The input packet journal storage unit 22 is empty, and the step number storage unit 24 stores an initial step number (e g., 1). The candidate packet storage unit 25 is also empty, the maximum settled input order number storage unit 27 stores the initial input order number, and all flags of the delay storage unit 28 are reset.

An outline of an algorithm (algorithms 1 to 9) for determining an input packet to be delivered to respective computers by ordered multicast executed by this ordered multicast unit 2 is as follows.

(Algorithm 1)

When the corresponding step number is the initial step number, if an input packet is present in the input reception queue 1, the corresponding step number is incremented by one, the input candidate is selected as the self candidate, other candidates are emptied, and candidate-type protocol data is sent to all other computers.

(Algorithm 2)

When candidate-type protocol data having an input order number which matches the corresponding input order number is received, and that protocol data has a step number larger than the corresponding step number, the corresponding step number is updated to that step number, the self candidate and other candidates corresponding to the sender are set in the input packet field in the protocol data, candidates other than those candidates are emptied, and candidate-type protocol data is sent to all other computers.

(Algorithm 3)

When candidate-type protocol data having an input order number which matches the corresponding input order number is received, and that protocol data has a step number equal to the corresponding step number, other candidates corresponding to the sender are set in the input packet field in the protocol data.

(Algorithm 4)

If there are (n−f) or more non-empty "input candidates" in the candidate packet storage unit 25, the input packet settlement checking unit 26 executes the following operations.

If there are (n−f) or more "input candidates" with the same contents, that candidate is settled as an input packet at the corresponding input order number and is stored in the input packet journal storage unit 22. If that packet is present in the input reception queue 1, it is deleted. The input packet is delivered to the application program 3, the corresponding input order number is incremented by one, the corresponding step number is reset to the initial step number, the candidate packet storage unit 25 is emptied, and all flags of the delay storage unit 28 are reset.

Otherwise, if there are "input candidates" with the same contents, which hold the majority, in the candidate packet storage unit 25, the corresponding input order number is incremented by one, that input packet is selected as the self candidate in the candidate packet storage unit 25, other candidates are emptied, and candidate-type protocol data is sent to all other computers.

In any other circumstances, an input packet is randomly selected from the candidate packet storage unit 25, the corresponding input order number is incremented by one, that input packet is selected as the self candidate in the candidate packet storage unit 25, other candidates are emptied, and candidate-type protocol data is sent to all other computers.

(Algorithm 5)

When candidate-type protocol data having an input order number smaller than the corresponding input order number is received, and input data corresponding to that input order number is present in the input packet journal storage unit 22, settlement-type protocol data is sent back to the computer of the sender.

(Algorithm 6)

When settlement-type protocol data having an input order number that matches the corresponding input order number is received, that packet is settled as an input packet at the corresponding input order number and is stored in the input packet journal storage unit 26. If that packet is present in the input reception queue 1, it is deleted. The input packet is delivered to the application program 3, the corresponding input order number is incremented by one, the corresponding step number is reset to the initial step number, the candidate packet storage unit 25 is emptied, and all flags of the delay storage unit 28 are reset.

(Algorithm 7)

When candidate-type protocol data having an input order number smaller than the corresponding input order number is received, and input data corresponding to that input order number is not present in the input packet journal storage unit 22, delay-type protocol data is sent back to the computer of the sender.

(Algorithm 8)

When delay-type protocol data having an input order number that matches the corresponding input order number is received, a flag corresponding to the sender in the delay storage unit 28 is set.

(Algorithm 9)

When the sum of the number of set flags in the delay storage unit 28 and the number of other non-empty input candidates in the candidate packet storage unit 25 is equal to or larger than (n−f), and the number of non-empty input candidates in the candidate packet storage unit 25 is smaller than (n−f), the skip checking unit 29 executes the following skip operation.

The skip operation sets the corresponding input order number as the corresponding maximum settled input order number, resets the corresponding step number to the initial step number, empties the candidate packet storage unit 25, resets all flags of the delay storage unit 28, and sends a skip message to the program state management unit 4.

Note that (algorithm 1) to (algorithm 9) mentioned above are not always executed in the order named. That is, these algorithms are independently executed if their conditions are met.

Upon receiving the skip message, the program state management unit 4 copies the state immediately before the corresponding input order number from the program state management unit 4 of another computer. For this purpose, the program state management unit 4 holds a given number of states immediately before respective input order numbers from the latest one.

The effectiveness of this algorithm will be proved while explaining an outline of the operation of the aforementioned algorithm.

(Algorithm 1) to (algorithm 4) form a basic part for making one delivery of ordered multicast. The conventional system repeats the process until all normal computers match, but this distributed system repeats the process until (n−f) computers match.

(Algorithm 5) and (algorithm 6) forward the already settled input packet to eliminate a short multiplexing execution delay.

(Algorithm 7) to (algorithm 9) execute the skip operation to eliminate a long multiplexing execution delay in a leap.

The following description will prove that (algorithm 1) to (algorithm 6) meet requirements of ordered multicast. This can be proved by examining if identical input packets are settled at respective input order numbers.

(Algorithm 4) or (algorithm 6) settles an input packet. Since the settled input packet is forwarded in case of (algorithm 6), a computer which settled an input packet by (algorithm 4) first is always present. Let P be the input packet at the time of settlement, and S be the step number at that time.

We will prove first that no "input candidates" other than P are present in all computers in step S+1.

(Algorithm 1), (algorithm 2), or (algorithm 4) determines "input candidate" of the self computer. However, since step number S cannot be the initial step number, "input candidate" in step S+1 is determined by (algorithm 2) or (algorithm 4). Since (algorithm 2) forwards "input candidate", this can be proved by examining if no "input candidate" other than P in step S+1 is determined by (algorithm 4).

In order to determine "input candidate" in step S+1 by (algorithm 4), (n−f) "input candidates" are required in step S. Let X be this set. On the other hand, since a computer that settled the input packet by (algorithm 4) is present in step S, at least (n−f) "input candidates" are P. Let Y be this set. Then, the number of elements of $X \geq n-f$ the number of elements of $Y \geq n-f$ the number of elements of $X \cup Y \leq n$ the number of elements of X−the number of elements of $X \cap Y$=the number of elements of $X \cup Y$−the number of elements of $Y \leq n-(n-f)=f$ There are at most only f candidates of X, which are not P. If we can prove that f is smaller than the half of the number of elements of X, P accounts for a majority in X, and (algorithm 4) determines P. In this case, since the number of elements of $X-2f \geq (n-f)-2f = n-3f$ and n−3f>0, as described above, this can be proved.

Consequently, since no "input candidates" other than P are present in all computers in step S+1, if an input is settled at this input order number, P is settled. In this way, it is proved that the ordered multicast requirements are met.

Delay elimination done by (algorithm 5) to (algorithm 9) will be explained below.

This delay is generated when multiplexing is executed by more than (n−f) computers. The delayed computer is not necessary for multiplexing at that time. However, such computer is required to continue multiplexing when the leading computer has failed and halted. That is, in such case, the delayed computer must catch up with the final input order number.

In elimination of a short multiplexing execution delay done by (algorithm 5) and (algorithm 6), an input packet settled by the leading computer is forwarded. Since the input packet arrives in the same order, ordered multicast requirements are met.

On the other hand, elimination of a long multiplexing execution delay done by (algorithm 7) to (algorithm 9) uses the notion of so-called "leave behind". "Leave behind" occurs when the delay time is so long that an input packet settled by the leading computer is forgotten. If this "leave behind" is determined, a skip operation is done. Since the skip operation skips the input order number, some middle packets are dropped from the input packet sequence, and ordered multicast requirements cannot be met.

In order to compensate for the input packet sequence from which some middle packets are dropped, the program state management unit 4 makes consistent copy. With this process, multiplexing can continue without any conflict.

The relationship with unreliable datagrams will be explained below.

As for an output, since unreliable datagrams are output, the output filter 5 can operate arbitrarily. For example, if outputs are made without filtering, output packets, the number of which is equal to the number of computers that execute multiplexing, are output. Since unreliable datagrams allow redundancy of packets, the number of output packets falls within this range.

In this distributed system, since a multiplexing execution delay occurs, the order of output packets is likely to change. This is because the delayed computer executes the previous output after the leading computer outputs packets.

However, the setup of the output filter 5 is important in terms of performance and the like. For example, when (algorithm 4) settles an input packet, the output filter is set to be open; when (algorithm 6) settles an input packet, the output filter is set to be closed, thus reducing changes in order. Only when (algorithm 4) settles an input packet, and that input packet is deleted from the input reception queue 1, the output filter is set to be open; otherwise, the filter is set to be closed, thus reducing redundancy.

More specifically, this distributed system implements ordered multicast without using failure detection by delivering an input to (n−f) computers irrespective of the operation of other f computers, as long as at least (n−f) computers are in operation. Especially, delivery is not interrupted even upon occurrence of a failure.

In consideration of possibility of program multiplexing execution delay in a maximum of f computers, a mechanism for making delayed execution catch up without causing any split brain is implemented.

The operation sequence of the ordered multicast unit 2 will be described below with reference to FIGS. 5 to 10.

Figure 5:
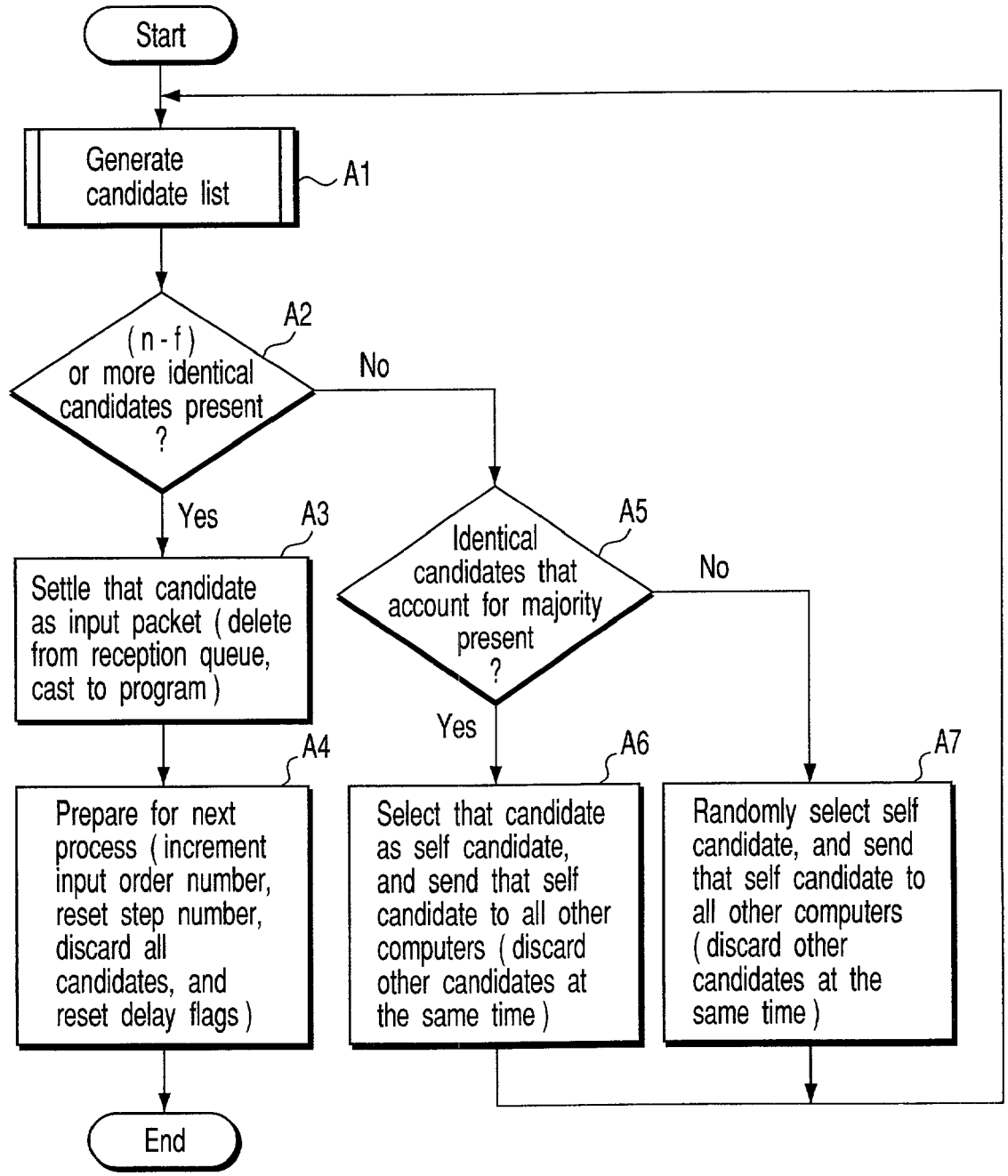
FIG. 5 is a first flow chart showing the operation sequence of a basic part for making one delivery of ordered multicast executed by the distributed system of the embodiment.
Figure 6:
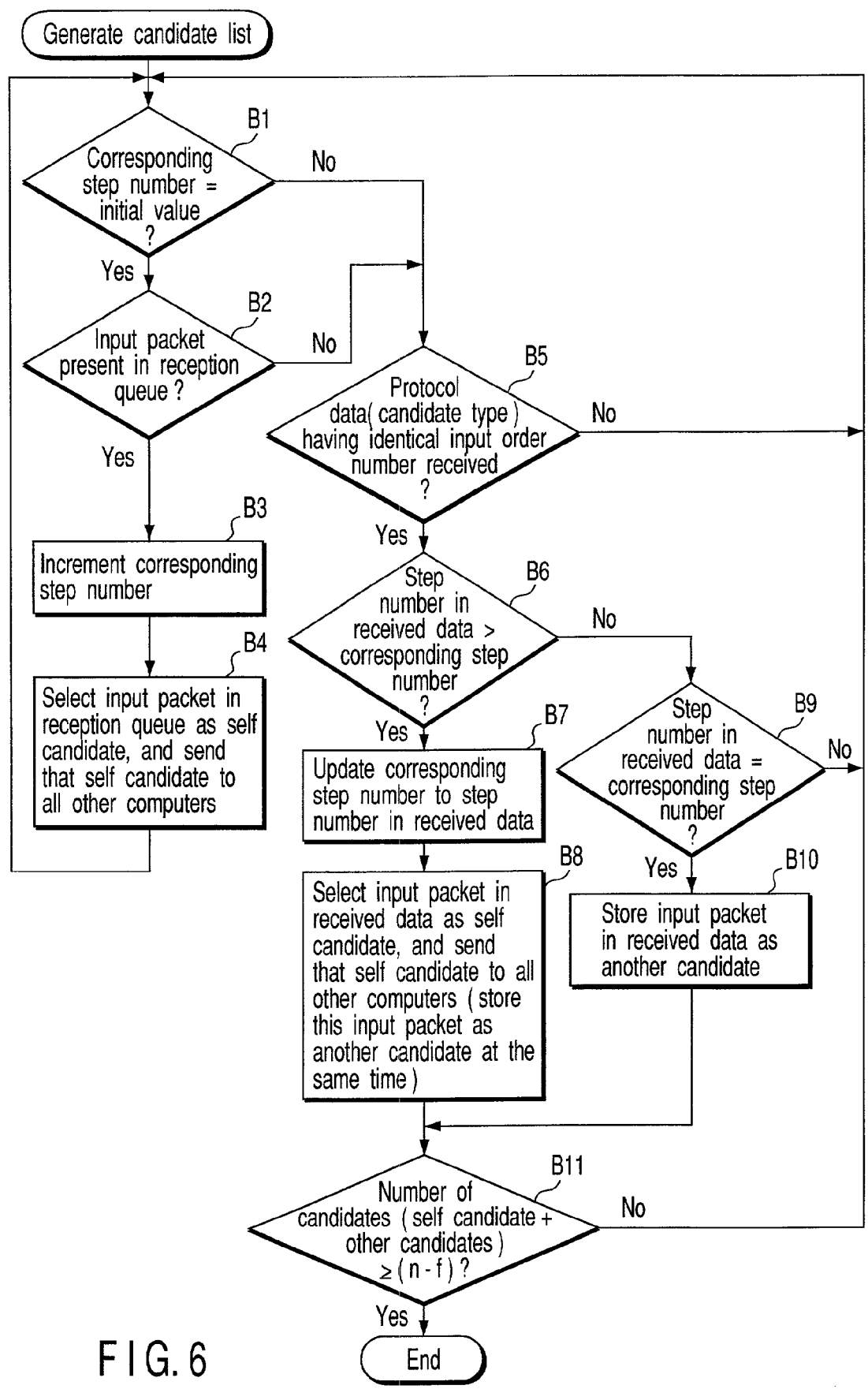
FIG. 6 is a second flow chart showing the operation sequence of the basic part for making one delivery of ordered multicast executed by the distributed system of the embodiment.

FIGS. 5 and 6 are flow charts showing the operation sequence of a basic part for making one delivery of ordered multicast.

The ordered multicast unit 2 executes a candidate list generation process (step A1 in FIG. 5). In this candidate list generation process, if the corresponding step number assumes an initial value (YES in step B1), it is checked if an input packet is present in the reception queue (step B2 in FIG. 6). If the input packet is present (YES in step B2 in FIG. 6), the corresponding step number is incremented by one (step B3 in FIG. 6), and the input packet in the reception queue is selected as the self candidate, which is sent to all other computers (step B4 in FIG. 6).

On the other hand, if the corresponding step number is not an initial value (NO in step B1 in FIG. 6) or if no input packet is present in the reception queue (NO in step B2 in FIG. 6), the ordered multicast unit 2 checks if protocol data having the same input order number is received (step B5 in FIG. 6). If such protocol data is received (YES in step B5 in FIG. 6), the ordered multicast unit 2 checks in turn if the step number in the received data is larger than the corresponding step number (step B6 in FIG. 6). If the step number in the received data is larger than the corresponding step number (YES in step B6 in FIG. 6), the ordered multicast unit 2 updates the corresponding step number to the step number in the received data (step B7 in FIG. 6), selects an input packet in the received data as a self candidate, and sends that self candidate to all other computers (step B8 in FIG. 6). At this time, the ordered multicast unit 2 stores this input packet as another candidate. If the step number in the received number is equal to the corresponding step number (NO in step B6 in FIG. 6, YES in step B9), the ordered multicast unit 2 stores an input packet in the received data as another candidate (step B10 in FIG. 6).

The ordered multicast unit 2 checks if the number of stored candidates becomes equal to or larger than (n−f) (step B11 in FIG. 6). If the number of stored candidates is smaller than (n−f) (NO in step B11 in FIG. 6), the ordered multicast unit 2 repeats the process from step B1; otherwise (YES in step B11 in FIG. 6), this process ends.

Upon completion of the candidate list generation process, the ordered multicast unit 2 checks if (n−f) or more identical candidates are present (step A2 in FIG. 5). If (n−f) or more identical candidates are present (YES in step A2 in FIG. 5), the ordered multicast unit 2 settles that candidate as an input packet (step A3 in FIG. 5). That is, the ordered multicast unit 2 deletes that input packet from the reception queue, and casts it to the application program 3. The ordered multicast unit 2 increments the input order number by one, resets the corresponding step number, discards all stored candidates, and resets delay flags so as to prepare for the next process (step A4 in FIG. 5).

On the other hand, if (n−f) or more identical candidates are not present (NO in step A2 in FIG. 5), the ordered multicast unit 2 checks if identical candidates that hold the majority are present (step A5 in FIG. 5). If such candidates are present (YES in step A5 in FIG. 5), the ordered multicast unit 2 selects that candidate as a self candidate, and sends that self candidate to all other computers (step A6 in FIG. 5). Then, the ordered multicast unit 2 repeats the process from step A1. At this time, the ordered multicast unit 2 discards all stored other candidates. On the other hand, if identical candidates which hold the majority are not present (NO in step A5 in FIG. 5), the ordered multicast unit 2 randomly selects a self candidate, and sends that self candidate to all other computers (step A7 in FIG. 5). Then, the ordered multicast unit 2 repeats the process from step A1. At this time as well, the ordered multicast unit 2 discards all stored other candidates.

With the aforementioned sequence, respective computers execute processes while confirming a match of (n–f) or more computers without failure detection.

FIGS. 7 to 10 are flow charts showing the operation sequence for eliminating a multiplexing execution delay.

Figure 7:
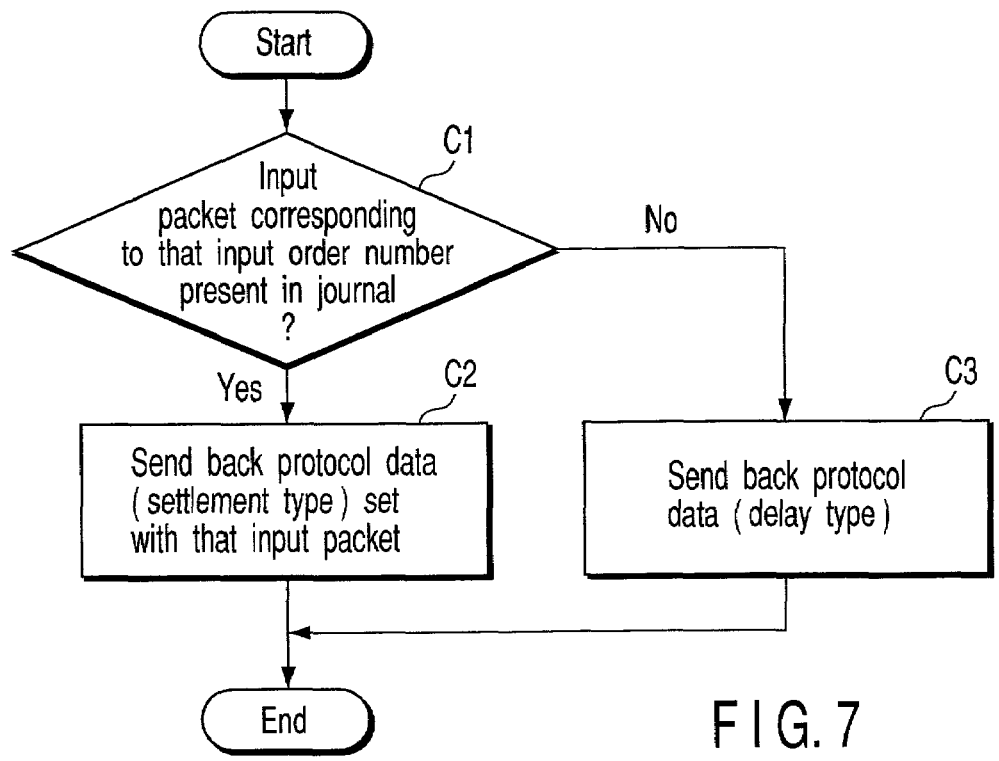
FIG. 7 is a first flow chart showing an operation sequence for eliminating delay of multiplexing execution executed by the distributed system of the embodiment.

Upon receiving candidate-type protocol data having an input order number smaller than the corresponding input order number, the ordered multicast unit 2 checks if an input packet corresponding to that input order number is present in a journal (step C1 in FIG. 7). If that packet is present in the journal (YES in step C1 in FIG. 7), the ordered multicast unit 2 sends back settlement-type protocol data set with that input packet to the sender (step C2 in FIG. 7); otherwise (NO in step C1 in FIG. 7), it sends back delay-type protocol data to the sender (step C3 in FIG. 7).

Figure 8:
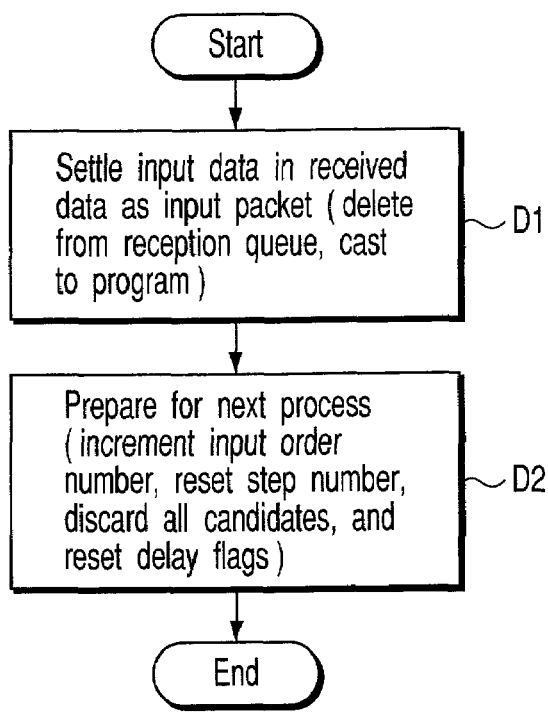
FIG. 8 is a second flow chart showing the operation sequence for eliminating delay of multiplexing execution executed by the distributed system of the embodiment.

Upon receiving settlement-type protocol data having an input order number that matches the corresponding input order number, the ordered multicast unit 2 settles an input packet in that received data as an input packet (step D1 in FIG. 8). That is, the ordered multicast unit 2 deletes that input packet from the reception queue, and casts it to the application program 3. The ordered multicast unit 2 increments the input order number by one, resets the corresponding step number, discards all stored candidates, and resets delay flags so as to prepare for the next process (step D2 in FIG. 8).

Figure 9:
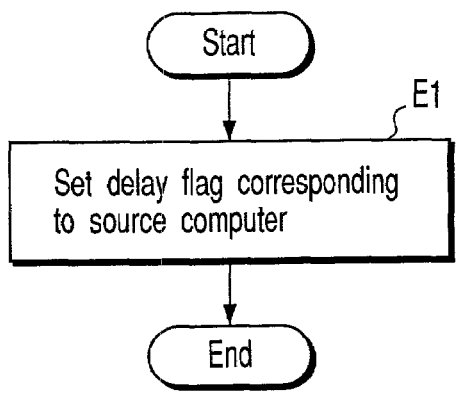
FIG. 9 is a third flow chart showing the operation sequence for eliminating delay of multiplexing execution executed by the distributed system of the embodiment.

Upon receiving delay-type protocol data having an input order number that matches the corresponding input order number, the ordered multicast unit 2 sets a delay flag corresponding to the sender (step E1 in FIG. 9).

Figure 10:
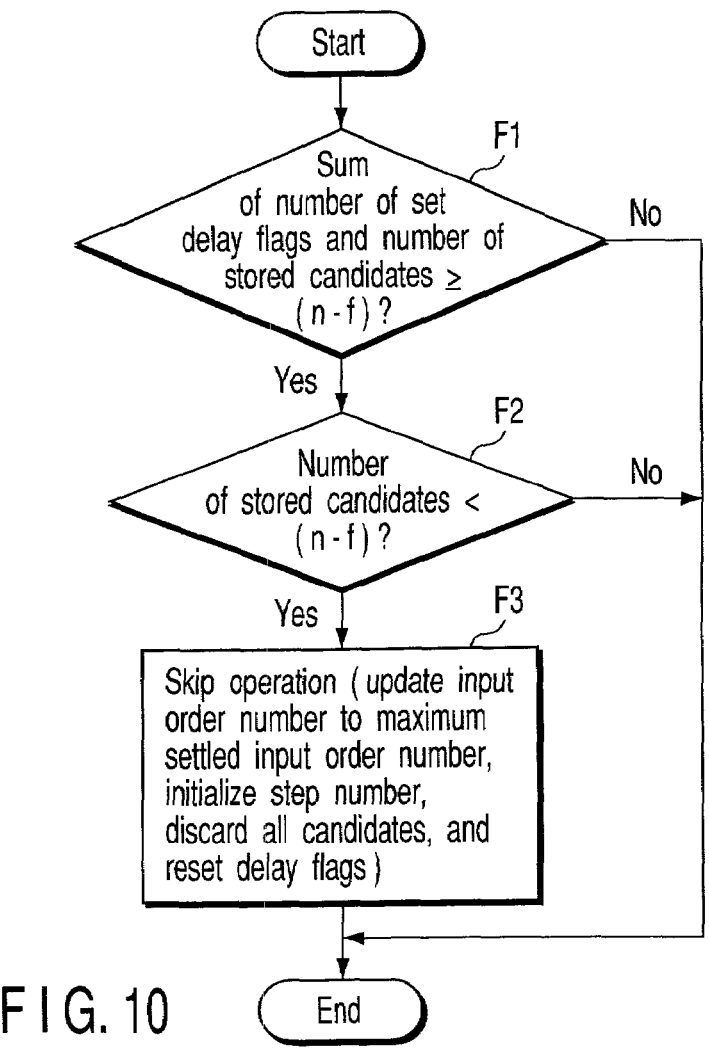
FIG. 10 is a fourth flow chart showing the operation sequence for eliminating delay of multiplexing execution executed by the distributed system of the embodiment.

The ordered multicast unit 2 monitors if the sum of the number of set delay flags and the number of stored candidates becomes equal to or larger than (n–f) (step F1 in FIG. 10). If the sum becomes equal to or larger than (n–f) (YES in step F1 in FIG. 10), the ordered multicast unit 2 checks if the number of stored candidates is smaller than (n–f) (step F2 in FIG. 10). If the number of stored candidates is smaller than (n–f) (YES in step F2 in FIG. 10), the ordered multicast unit 2 executes a skip operation (step F3 in FIG. 10). That is, the ordered multicast unit 2 sets the corresponding input order number as the corresponding maximum settled input order number, resets the corresponding step number to an initial step number, empties the candidate packet storage unit 25, resets all flags of the delay storage unit 28, and then sends a skip message to the program state management unit 4.

With the aforementioned sequence, each computer implements a mechanism which allows delayed execution to catch up without causing any split brain.

In the distributed system that performs ordered multicast, all computers 100 must execute application programs 3 using the same time. That is, a function of adjusting the time used upon executing the application programs 3 among all the computers 100 is required. An example of implementing the function of adjusting the time used upon executing the application programs 3 among all the computers 100 using the aforementioned ordered multicast mechanism will be explained below.

Figure 11:
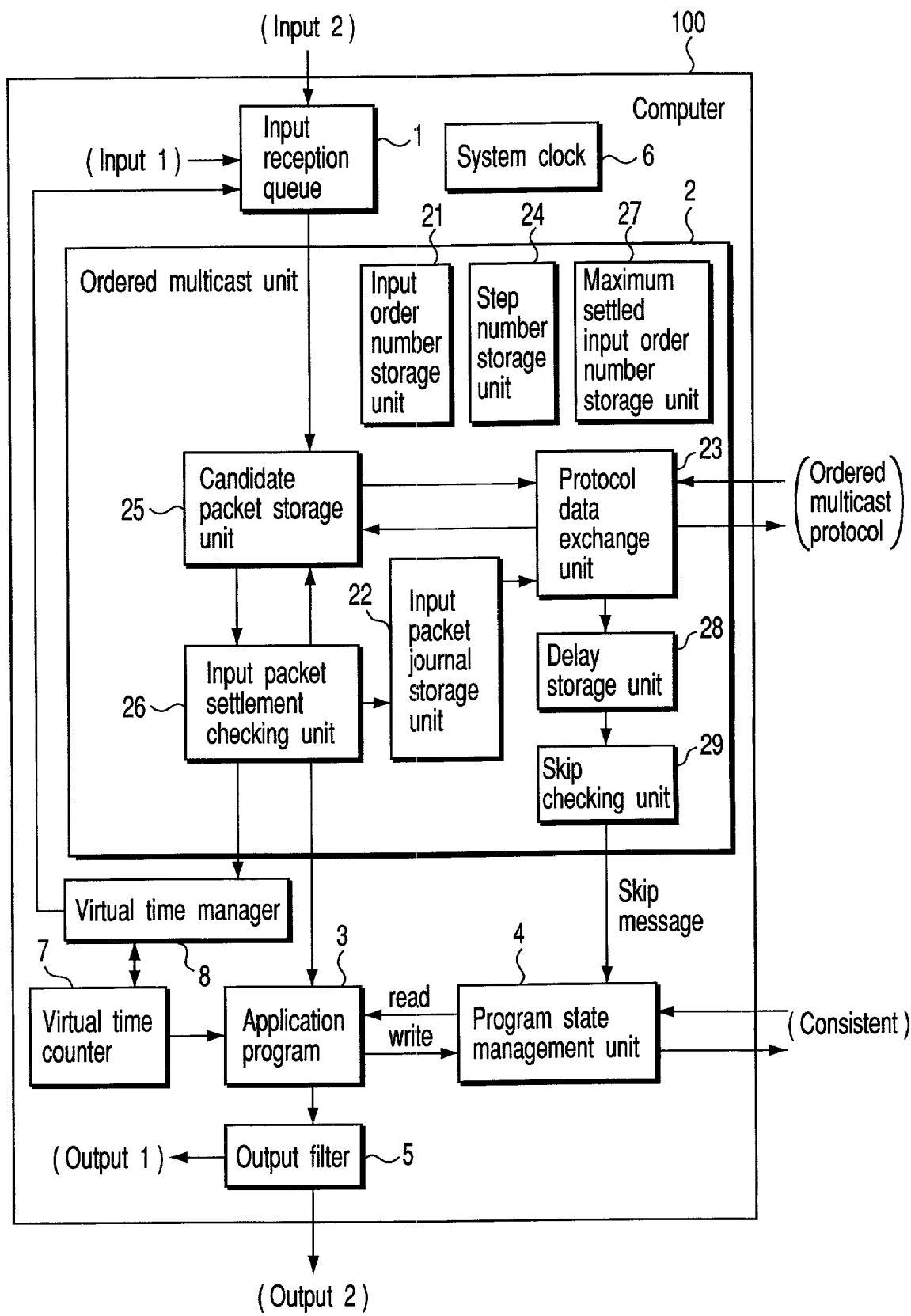
FIG. 11 is a block diagram of a computer to explain an example that implements a function of adjusting the time used upon executing application programs among all computers.

FIG. 11 is a block diagram of the computer 100 to explain an example of implementing the function of adjusting the time used upon executing the application programs 3 among all the computers 100.

As shown in FIG. 11, this computer 100 comprises a virtual time counter 7 for counting the time used upon executing the application program 3, and a virtual time manager 8 for managing this virtual time counter 7 in addition to a system clock 6 that counts a so-called "system time".

Upon starting up the computer 100, the initial condition of the virtual time counter 7 is made to be an un-setup condition.

After that, the virtual time manager 8 casts an input packet with high priority for giving an increment timing of the virtual time counter 7 to the input reception queue 1, e.g., every second. This input packet is immediately fetched by the ordered multicast unit 2 due to its priority level, and is set as the self candidate, which is an input candidate of the self computer. As a result, the input settlement checking unit 26 settles this input packet as the next input, casts it to the virtual time manager 8. At this time, in other computers 100, the input settlement checking unit 26 settles this input packet as the next input, and casts it to the virtual time manager 8.

Upon receiving this input packet, the virtual time manager 8 increments the virtual time counter 7 by a predetermined value (normally, 1 sec). The virtual time manager 8 also removes this input packet from the reception queue, and prepares for re-casting this input packet to the input reception queue 1 in one second from this moment. At this time, in other computers 100, if this packet is present in the input reception queue 1, the virtual time manager 8 removes this input packet from the reception queue, and prepares for re-casting this input packet to the input reception queue 1 in one second from this moment. That is, even if this input packet casted by other virtual time manager 8 is settled, the virtual time manager 8 processes this input packet just as though casted by itself, and does not cast this input packet until one second later from this moment. In this way, all the computers 100 can count the virtual time at the same timing.

On the other hand, the virtual time manager 8 casts an input packet with high priority for giving a comparison timing between the system time and virtual time to the input reception queue 1 when starting up the computer 100 and, e.g., every hour. At this time, the virtual time manager 8 stores the system time counted by the system clock 6 in this input packet. Since this input packet is sent to other computers by the protocol data exchange unit 23, other computers consequently receive the system time message of the self computer. Likewise, when the virtual time manager 8 of another computer generates this input packet, the self computer receives the system time message of that computer.

Upon receiving the input packet, the virtual time manager 8 compares the system time of the self computer or another computer stored in that input packet with the virtual time counted by the virtual time counter 7. If the virtual time counter 7 is in an un-setup condition, the virtual time manager 8 stores the system time counted by the system clock 6 in the virtual time counter. On the other hand, if the virtual time counter 7 is not in an un-setup condition and the system time leads the virtual time, the virtual time manager 8 executes a process for advancing the virtual time faster than a normal state. For example, the increment width of the virtual time counter 7 upon casting an input packet that gives the increment timing of the virtual time counter is set to be larger than the normal state.

That is, the virtual times of the respective computers are adjusted to the most leasing system time of n computers. Even when the system times of n computers are different, the virtual time used by respective computers upon executing the application programs 3 can be matched.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A distributed system which makes n computers, which are connected via a network, operate synchronously, and provides multiplexing of at least (n–f) computers, n being an integer and f being a maximum integer where 3f<n, each computer comprising:

an input candidate collection device configured to collect input data items, each of which is selected as a next candidate to be processed by each of n computers, via the network;

a first input candidate selection control device configured to determine whether not less than (n–f) input data items having identical contents are present, when the input candidate collection device has collected the not less than (n–f) input data items, and to settle one of the input data items having identical contents as next data to be processed, when the not less than (n–f) input data items having the identical contents are present;

a second input candidate selection control device configured to determine whether or not half of the collected input data items having identical contents are present, when the first input candidate selection control device determines that the not less than (n–f) input data items having identical contents are not present, and to cause the input candidate collection device to reexecute collection after selecting the input data item as a self candidate and discard all the input data items of other candidates, when over half of the collected input data items are present;

a third input candidate selection control device configured to cause the input candidate collection device to reexecute collection after arbitrarily selecting an input data item from the collected input data items as a self candidate and discarding all input data items of other candidates, when the second input candidate selection control device determines that over half of the collected input data items are not present; and a journal device configured to hold the input data item settled by the first input candidate selection control device, and each of the first input candidate selection control device, the second input control input candidate selection control device, and the third candidate selection control device including:

a first input candidate adjustment control device configured to send the input data item held in the journal device as a settled input data item, when another computer collects an input data item of a step that has already been settled in the computer, and a second input candidate adjustment control device configured to settle an input data item as next data to be processed, when the input data item is sent from another computer as a settled input data item upon collecting input data items by the input candidate collection device.

2. A system according to claim 1, wherein the journal device holds the input data items in an order from a latest input data item in correspondence with a predetermined number of steps, the first input candidate adjustment control device sends a predetermined message to another computer, when the journal device does not hold a settled input data item to be sent to another computer, and each computer further comprises:

a state holding device configured to hold states of the computer just before the settled input data item is processed in steps already settled in the computer in correspondence with a predetermined number of steps;

a state exchange device configured to exchange the state in each step held by the state holding device with another computer; and a skip device configured to acquire a state corresponding to the latest settled step of another computer by the state exchange device, and to copy the acquired state to the computer, when a sum of the number of collected input data items and the number of the predetermined messages which are sent from the other computers is not less than (n–f), and the number of collected input data items is less than (n–f) upon collecting input data items by the input candidate collection device.

3. A system according to claim 1, wherein each computer further comprises:

a counter configured to count a virtual time used in a process of an input data item;

a first input data item generation device configured to periodically generate a first input data item for giving an increment timing of a value of the counter;

a second input data item generation device configured to generate a second input data item for giving a comparison timing between a system time and the virtual time counted by the counter, the second input data item including the system time of the computer; and a virtual time adjustment device configured to compare the system time obtained from the second input data item with the virtual time counted by the counter, and to set an increment width of the value of the counter upon processing the first input data item to be large, when the system time leads the virtual time.

4. A multiplexing control method for a distributed system which makes n computers, which are connected via a network, operate synchronously, and provides multiplexing of at least (n–f) computers, n being an integer and f being a maximum integer where 3f<n, each computer performing:

an input candidate collection step of collecting input data items, each of which is selected as a next candidate to be processed by each of n computers, via the network;

a first input candidate selection control step of determining whether not less than (n–f) input data items having identical contents are present, when the input candidate collection step has collected the not less than (n–f) input data items, and settling one of the input data items having identical contents as next data to be processed, when the not less than (n f) input data items having identical contents are present;

a second input candidate selection control step of determining whether or not over half of the collected input data items having identical contents are present, when it is determined in the first input candidate selection control step that the not less than (n−f) input data items having identical contents are not present, and causing the input candidate collection step to reexecute collection after selecting the input data item as a self candidate and discarding all the input data items of other candidates, when over half of the collected input data items are present;

a third input candidate selection control step of causing the input candidate collection step to reexecute collection after arbitrarily selecting an input data item from the collected input data items as a self candidate and discarding all the input data items of other candidates, when it is determined in the second input candidate selection control step that over half of the collected input data items are not present; and a journal step of holding the input data item settled in the first input candidate selection control step, and each of the first input candidate selection control device, the second input control input candidate selection control device, and the third candidate selection control device including:

a first input candidate adjustment control step of sending the input data item held in the journal step as a settled input data item, when another computer collects an input data item of a step that has already been settled in the computer, and a second input candidate adjustment control step of settling an input data item as next data to be processed, when the input data item is sent from another computer as a settled input data item upon collecting input data items in the input candidate collection step.

5. A method according to claim 4, wherein the journal step holds the input data items in an order from latest input data item in correspondence with a predetermined number of steps, the first input candidate adjustment control step sends a predetermined message to another computer, when settled input data to be sent to another computer is not held in the journal step, and each computer further performing:

a state holding step of holding states of the computer just before the settled input data item is processed in steps already settled in the computer in correspondence with a predetermined number of steps;

a state exchange step of exchanging the state in each step held in the state holding step with another computer; and a skip step of acquiring a state corresponding to the latest settled step of another computer by the state exchange step, and copying the acquired state to the computer, when a sum of the number of collected input data items and the number of the predetermined messages which are sent from other computers is not less than (n−f), and the number of collected input data items is less than (n−f) upon collecting input data items in the input candidate collection step.

6. A method according to claim 4, wherein each computer further performs:

a first input data item generation step of periodically generating a first input data item for giving an increment timing of a value of a counter configured to count a virtual time used in a process of input data;

a second input data item generation step of generating a second input data item for giving a comparison timing between a system time and the virtual time counted by the counter, the second input data item including the system time of the computer; and a virtual time adjustment step of comparing the system time obtained from the second input data item with the virtual time counted by the counter, and setting an increment width of the value of the counter upon processing the first input data item to be large, when the system time leads the virtual time.

\* \* \* \* \*